United States Patent
Arseneault et al.

(10) Patent No.: US 8,716,981 B2
(45) Date of Patent: May 6, 2014

(54) SYSTEM AND METHOD FOR COOLING AND CYCLING A BATTERY PACK

(75) Inventors: Scott Arseneault, Macomb Township, MI (US); Kenneth Oswandel, Livonia, MI (US)

(73) Assignee: LG Chem, Ltd., Seoul (KR)

( * ) Notice: Subject to any disclaimer, the term of this patent is extended or adjusted under 35 U.S.C. 154(b) by 385 days.

(21) Appl. No.: 13/294,281

(22) Filed: Nov. 11, 2011

(65) Prior Publication Data
US 2013/0119937 A1 May 16, 2013

(51) Int. Cl.
*H02J 7/00* (2006.01)

(52) U.S. Cl.
USPC .......................................... 320/130; 320/150

(58) Field of Classification Search
USPC .......................................................... 320/130
See application file for complete search history.

(56) References Cited

U.S. PATENT DOCUMENTS

| | | | |
|---|---|---|---|
| 4,214,204 A | 7/1980 | Eberle | |
| 4,311,917 A * | 1/1982 | Hencey et al. | 290/1 A |
| 4,363,407 A | 12/1982 | Buckler et al. | |
| 5,357,423 A | 10/1994 | Weaver et al. | |
| 5,901,572 A * | 5/1999 | Peiffer et al. | 62/480 |
| 6,138,466 A * | 10/2000 | Lake et al. | 62/199 |
| 6,762,610 B1 | 7/2004 | Brilmyer et al. | |
| 7,109,700 B2 | 9/2006 | Fazzina | |
| 7,915,856 B2 | 3/2011 | Krampitz et al. | |
| 7,974,797 B2 | 7/2011 | Shoji | |
| 8,487,631 B2 | 7/2013 | Yuasa et al. | |
| 2001/0019270 A1 | 9/2001 | Onishi et al. | |
| 2002/0062650 A1 * | 5/2002 | Dukhan et al. | 62/5 |
| 2003/0139888 A1 | 7/2003 | Burns | |
| 2004/0108856 A1 | 6/2004 | Johnson | |
| 2005/0134283 A1 | 6/2005 | Potempa | |
| 2005/0257533 A1 * | 11/2005 | Gunawardana et al. | 62/5 |
| 2005/0264296 A1 | 12/2005 | Philbrook | |
| 2006/0012341 A1 | 1/2006 | Burns | |
| 2007/0252555 A1 | 11/2007 | Potempa | |
| 2007/0261415 A1 * | 11/2007 | Barnes | 62/5 |

(Continued)

FOREIGN PATENT DOCUMENTS

| | | |
|---|---|---|
| GB | 2291737 A | 1/1996 |
| JP | S5999271 A | 6/1984 |

(Continued)

OTHER PUBLICATIONS

U.S. Appl. No. 12/970,031, filed Dec. 16, 2010 entitled Ultrasonic Welding System and Method for Forming a Weld Joint.

(Continued)

*Primary Examiner* — Arun Williams
(74) *Attorney, Agent, or Firm* — Buckert Patent & Trademark Law Firm, P.C.; John F. Buckert

(57) ABSTRACT

A system and a method for cooling and cycling a battery pack is provided. The system includes an air supplying device that outputs pressurized air. The system further includes a vortex tube that receives the pressurized air and outputs cooled air at a first temperature level utilizing the pressurized air. The system further includes at least one heat exchanger disposed in the battery pack that receives the cooled air from the vortex tube and cools the battery pack. The system further includes a battery cycling device configured to charge and discharge the battery pack when the battery pack is being cooled.

10 Claims, 7 Drawing Sheets

(56) References Cited

U.S. PATENT DOCUMENTS

| | | |
|---|---|---|
| 2008/0231257 A1 | 9/2008 | Williams |
| 2008/0290877 A1 | 11/2008 | Oh et al. |
| 2009/0243621 A1 | 10/2009 | Kudo et al. |
| 2009/0251149 A1 | 10/2009 | Buckner et al. |
| 2010/0102975 A1 | 4/2010 | Vossmeyer et al. |
| 2011/0050235 A1 | 3/2011 | Bogdan, Jr. et al. |
| 2011/0116225 A1* | 5/2011 | Staben et al. ............ 361/679.46 |
| 2011/0254558 A1 | 10/2011 | Stancu et al. |
| 2011/0256430 A1 | 10/2011 | Stancu et al. |
| 2013/0015702 A1 | 1/2013 | Ito |
| 2013/0141105 A1 | 6/2013 | Tom et al. |

FOREIGN PATENT DOCUMENTS

| | | | |
|---|---|---|---|
| JP | H0797004 A | 4/1995 | |
| JP | H1140212 A | 2/1999 | |
| JP | 2007280794 A | 10/2007 | |
| KR | 20060068172 A | 6/2006 | |
| KR | 20090015273 A | 2/2009 | |
| KR | 20100003136 A | 1/2010 | |

OTHER PUBLICATIONS

U.S. Appl. No. 12/970,066, filed Dec. 16, 2010 entitled System and Method for Determining Whether an Ultrasonic Horn is Aligned with an Anvil.

U.S. Appl. No. 13/005,685, filed Jan. 31, 2011 entitled Ultrasonic Welding System and Method for Forming a Weld Joint Utilizing the Ultrasonic Welding System.

International Search Report for International application No. PCT/KR2012/009014 dated Feb. 28, 2013.

U.S. Appl. No. 13/308,817, filed Dec. 1, 2011 entitled Test System for a Battery Module.

U.S. Appl. No. 13/626,915, filed Sep. 26, 2012 entitled System and Method for Determining an Isolation Resistance of a Battery Pack Disposed on a Vehicle Chassis.

* cited by examiner

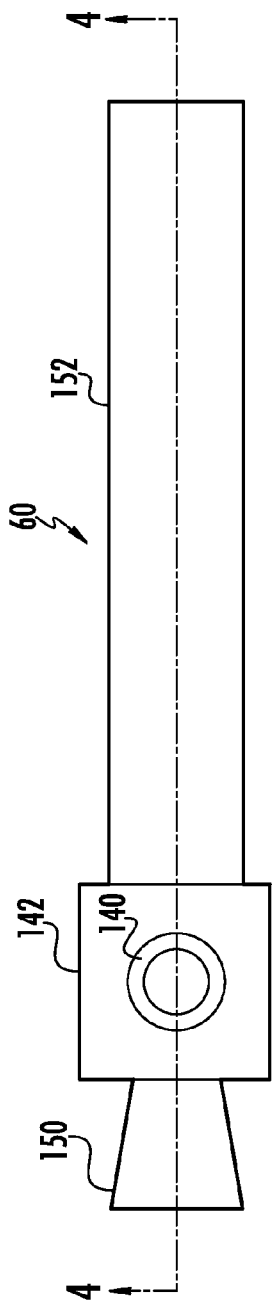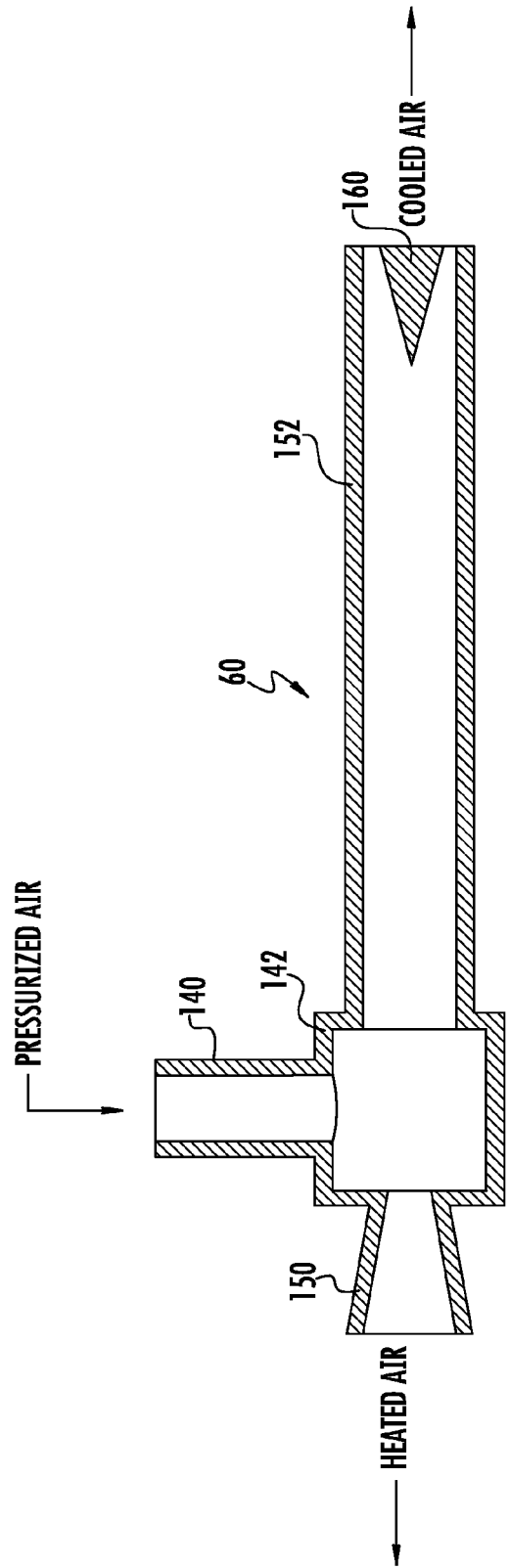

SYSTEM AND METHOD FOR COOLING AND CYCLING A BATTERY PACK

BACKGROUND

Battery packs are charged and discharged during testing. However, the inventors herein have recognized that the battery packs may overheat during testing if they are not cooled.

The inventors herein have recognized a need for an improved system and method for cooling and cycling a battery pack.

SUMMARY

A system for cooling and cycling a battery pack in accordance with an exemplary embodiment is provided. The system includes an air supplying device configured to output pressurized air. The system further includes a vortex tube configured to receive the pressurized air from the air supplying device and to output cooled air at a first temperature level utilizing the pressurized air. The system further includes at least one heat exchanger disposed in the battery pack that is configured to receive the cooled air from the vortex tube and to cool the battery pack. The system further includes a battery cycling device electrically being coupled to the battery pack. The battery cycling device is configured to charge and discharge the battery pack when the battery pack is being cooled.

A method for cooling and cycling a battery pack in accordance with another exemplary embodiment is provided. The method includes outputting pressurized air from an air supplying device. The method further includes receiving the pressurized air from the air supplying device at a vortex tube and outputting cooled air from the vortex tube at a first temperature level in response to the pressurized air. The method further includes receiving the cooled air from the vortex tube in at least one heat exchanger disposed in the battery pack and cooling the battery pack utilizing the heat exchanger. The method further includes charging and discharging the battery pack utilizing a battery cycling device when the battery pack is being cooled.

BRIEF DESCRIPTION OF THE DRAWINGS

FIG. 3 is a schematic of a vortex tube utilized in the system of FIG. 1;

FIG. 4 is a cross-sectional schematic of the vortex tube of FIG. 3;

DETAILED DESCRIPTION

Figure 1:
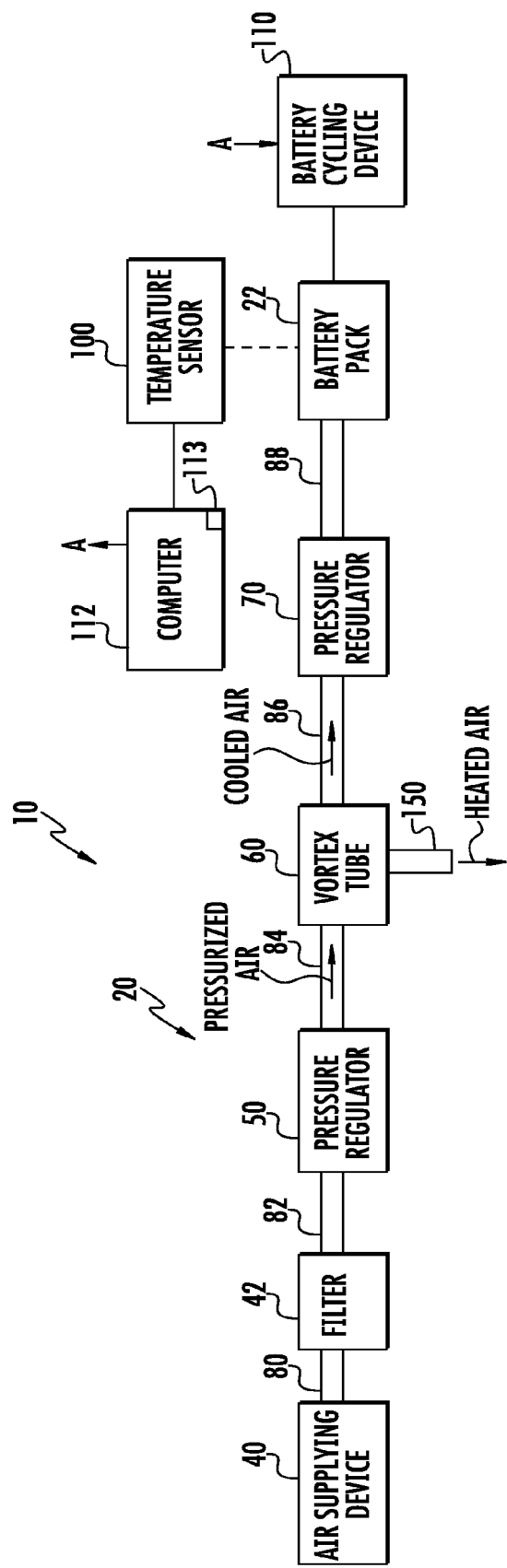
FIG. 1 is a block diagram of a system for cooling and cycling a battery pack in accordance with an exemplary embodiment.
Figure 2:
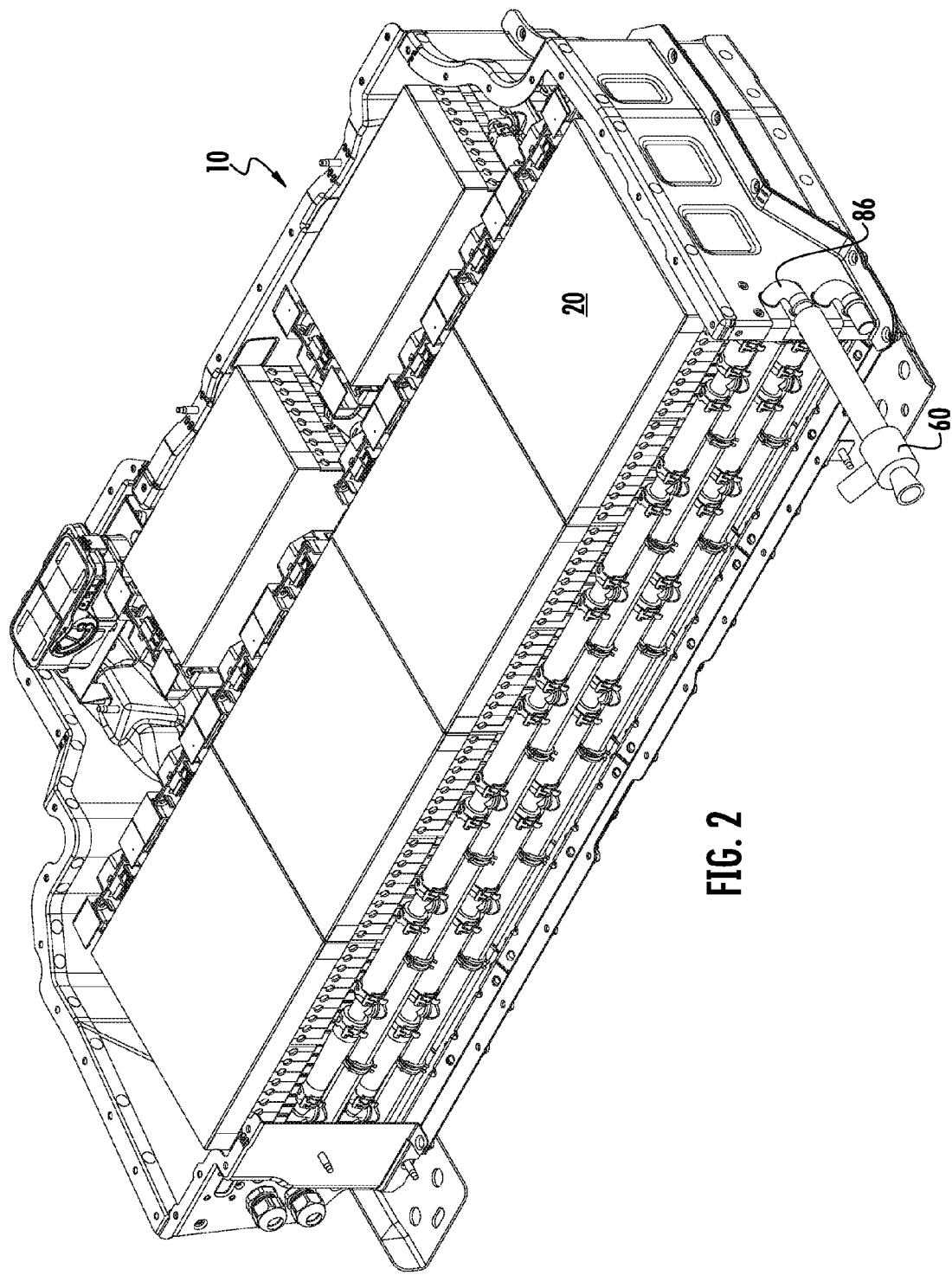
FIG. 2 is a schematic of a battery pack in accordance with another exemplary embodiment.
Figure 5:
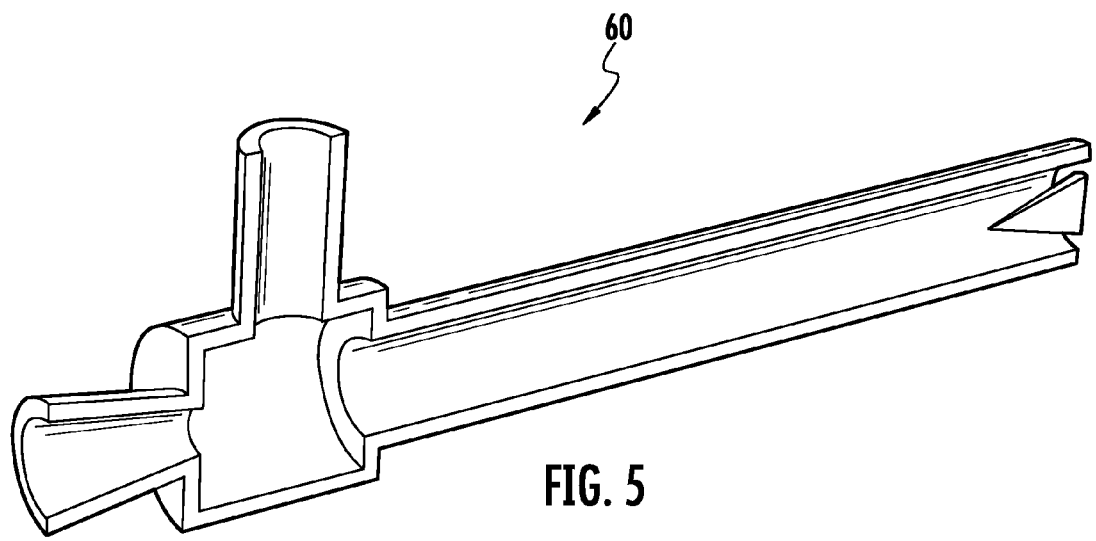
FIG. 5 is another cross-sectional schematic of the vortex tube of FIG. 3.

Referring to FIG. 1, a system 10 for cycling a battery pack 22 in accordance with an exemplary embodiment is provided. The system includes an air supplying device 40, a filter 42, a pressure regulator 50, a vortex tube 60, a pressure regulator 70, conduits 80, 82, 84, 86, 88, a temperature sensor 100, a battery cycling device 110, and a computer 112. An advantage of the system 10 is that that the system 10 utilizes a dry process to cool the battery pack 22 during cycling of the battery pack. In particular, in one exemplary embodiment, the system 10 utilizes cooled air to cool the battery pack 22, instead of utilizing water, or anti-freeze, or another liquid coolant.

Figure 6:
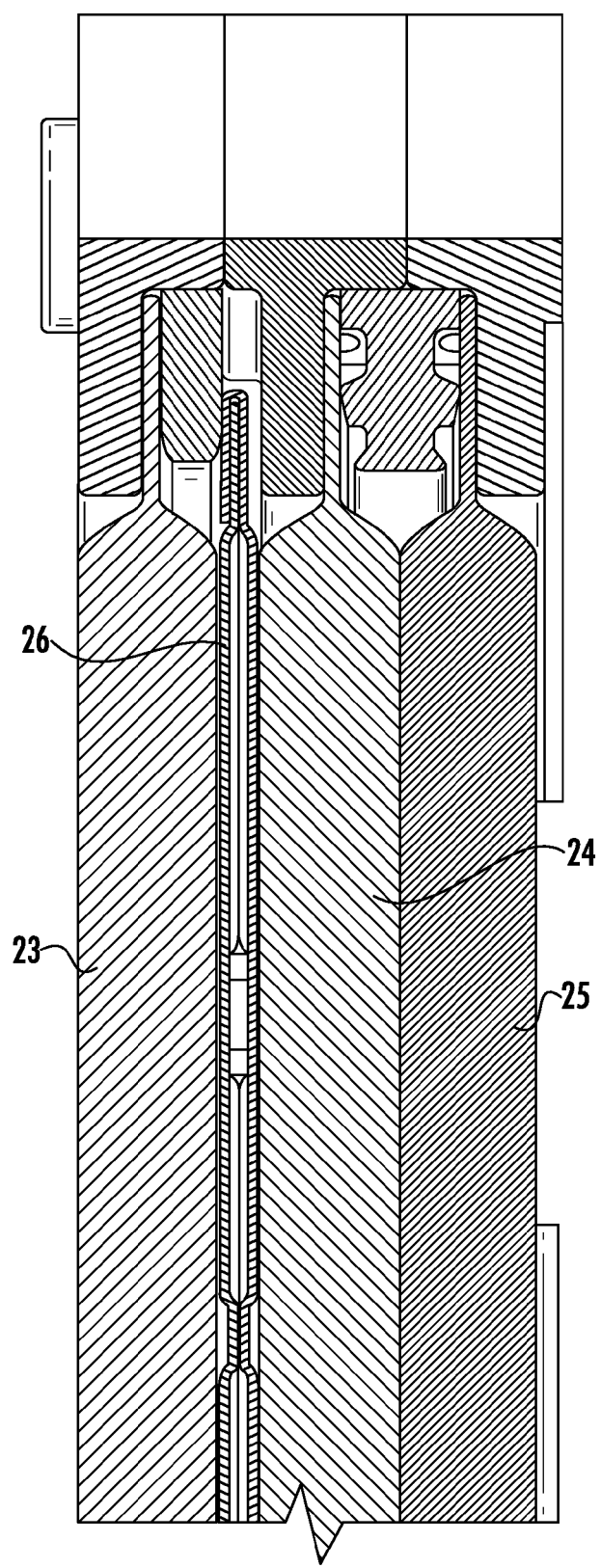
FIG. 6 is a cross-sectional schematic of a portion of the battery pack of FIG. 2 including battery cells and a heat exchanger.
Figure 7:
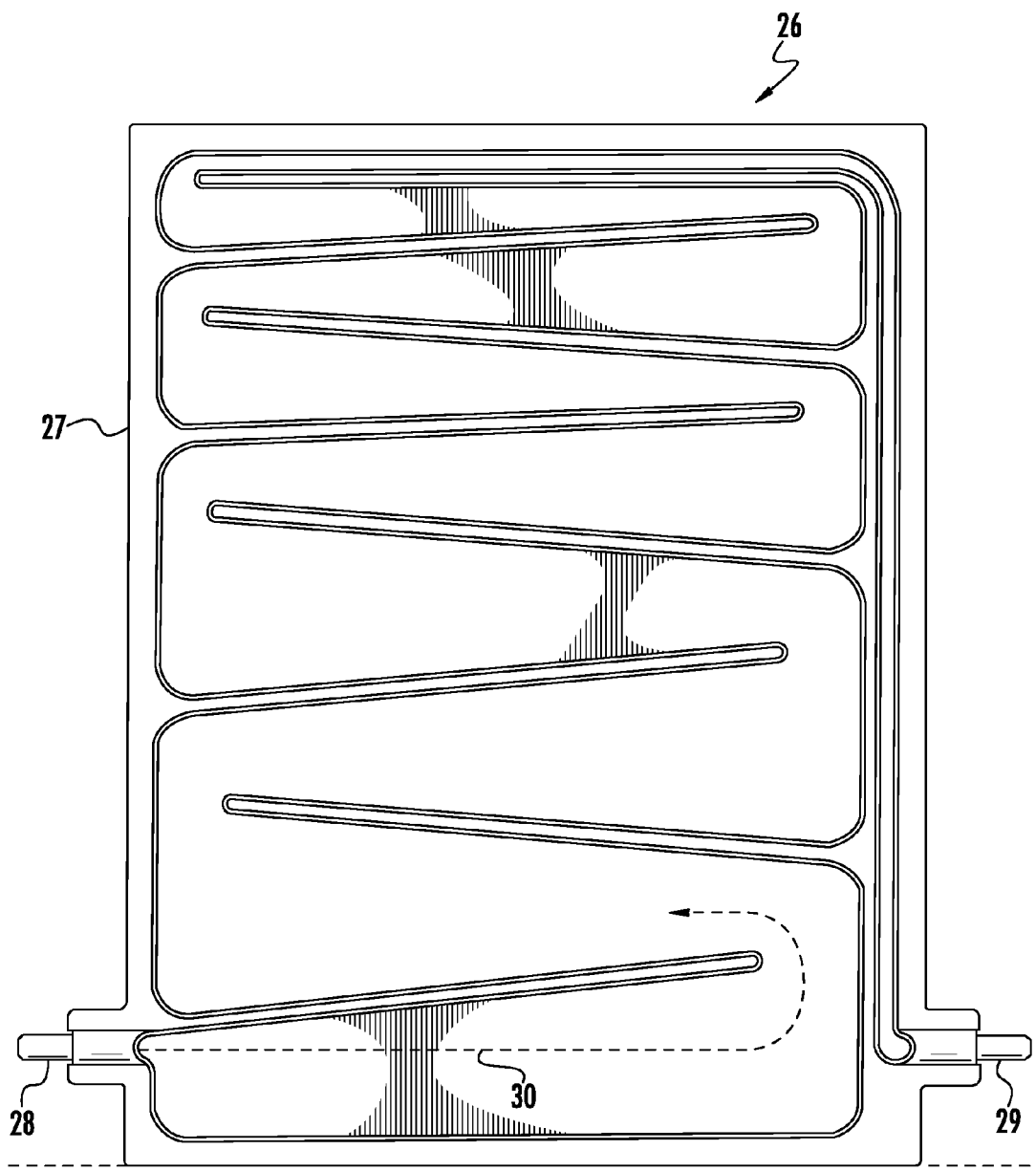
FIG. 7 is a schematic of the heat exchanger of FIG. 6.

Referring to FIGS. 1, 6 and 7, the battery pack 22 includes a plurality of battery cells including battery cells 23, 24, 25 for example. Also, the battery pack 22 includes a plurality of heat exchangers, such as a heat exchanger 26, for extracting heat energy from battery cells disposed proximate to the heat exchanger 26, such as the battery cells 23, 24, 25 for example. In one exemplary embodiment, the battery cells 23, 24, 25 are pouch-type lithium-ion battery cells. Of course, in alternative embodiments, other types of battery cells are contemplated.

Referring to FIGS. 6 and 7, the heat exchanger 26 includes a housing 27, an inlet port 28, an outlet port 29, and an internal flow path 30 defined by the housing 27. The inlet port 28 and the outlet port 29 are fluidly coupled to the housing 27. During cycling of the battery pack 22, the heat exchanger 26 receives cooled air which is utilized by a heat exchanger 26 to extract heat energy from the battery cells 23, 24, 25, as will be discussed in greater detail below.

Referring to FIG. 1, the air supplying device 40 is configured to output pressurized air. In one exemplary embodiment, the air supplying device 40 is an air compressor. As shown, the air supplying device 40 is fluidly coupled to a conduit 80.

The filter 42 is configured to remove particulates in the air flowing through the filter 42. The filter 42 is fluidly coupled between the conduit 80 and the conduit 82.

The pressure regulator 50 is configured to adjust a pressure level of the air being supplied to the vortex tube 60. The pressure regulator 50 is fluidly coupled between the conduit 82 and the conduit 84 which is further coupled to the vortex tube 60.

Referring to FIGS. 1-5, the vortex tube 60 is configured to receive the pressurized air from the air supplying device 40 and to output cooled air at a first temperature level utilizing the pressurized air. The vortex tube 60 includes an inlet tube 140, a central chamber 142, a conical-shaped outlet tube 150, and an outlet tube 152. The outlet tube 152 has a conical-shaped member 160 disposed therein. The inlet tube 140 is fluidly coupled with the central chamber 142. Also, the conical-shaped outlet tube 150 and the outlet tube 152 are fluidly coupled to the central chamber 142.

Also, the inlet tube 140 is fluidly coupled to the conduit 84, and the outlet tube 152 is fluidly coupled to the conduit 86. During operation, pressurized air is received within the inlet tube 140. As the pressurized air flows through the vortex tube 60, heated air is released from the conical-shaped outlet tube 150, and cooled air is released from the outlet tube 152 into the conduit 86. The cooled air is utilized to cool the heat exchangers and battery cells within the battery pack 22.

The pressure regulator 70 is configured to adjust a pressure level of the air being received from the vortex tube 60 via the conduit 86. The pressure regulator 70 is fluidly coupled between the conduit 86 and the conduit 88 which is further coupled to the battery pack 22. In one exemplary embodiment, the pressure regulator 70 adjust the pressure level to less than or equal to 15 pounds per-square-inch.

As discussed above, referring to FIGS. 1 and 7, the battery pack 22 includes at least one heat exchanger 26. The heat exchanger 26 is configured to receive the cooled air from the conduit 88 that is received from the vortex tube 60 to cool the battery pack 22. The heat exchanger 26 receives the cooled air in the inlet port 28 which flows through the internal flow path 30 and out of the outlet port 29. The cooled air extracts heat energy from the heat exchanger 26 which further extracts heat energy from the battery cells proximate to the heat exchanger 26.

The battery cycling device 110 is electrically coupled to the battery pack 24. The battery cycling device 110 is configured to charge and discharge the battery pack 24 when the battery pack 24 is being cooled.

The temperature sensor 100 is disposed proximate to the battery pack 24 and generates a temperature signal indicative of a temperature level of the battery pack 24, that is received by the computer 112.

The computer 112 is operably coupled to the temperature sensor 100 and to the battery cycling device 110. The computer 112 is configured to receive the temperature signal and to determine the temperature level of the battery pack 22 based on the temperature signal. If the temperature level is less than a threshold temperature level, the computer 112 is further configured to generate a control signal to induce the battery cycling device 110 to charge and discharge the battery pack. In one exemplary embodiment, the threshold temperature level is 25 degrees Celsius. In an alternative embodiment, the threshold temperature level could be greater than 25° C. or less than 25° C. depending upon the charging and discharging characteristics of the particular battery pack. The computer 112 has an internal memory device 113 for storing executable software instructions and associated data for implementing the methods that will be explained in greater detail below. In one exemplary embodiment, the computer 112 comprises a microprocessor operably coupled to a memory device. Of course, in alternative embodiments, the computer 112 could comprise a programmable logic controller or a field programmable logic array.

Figure 8:
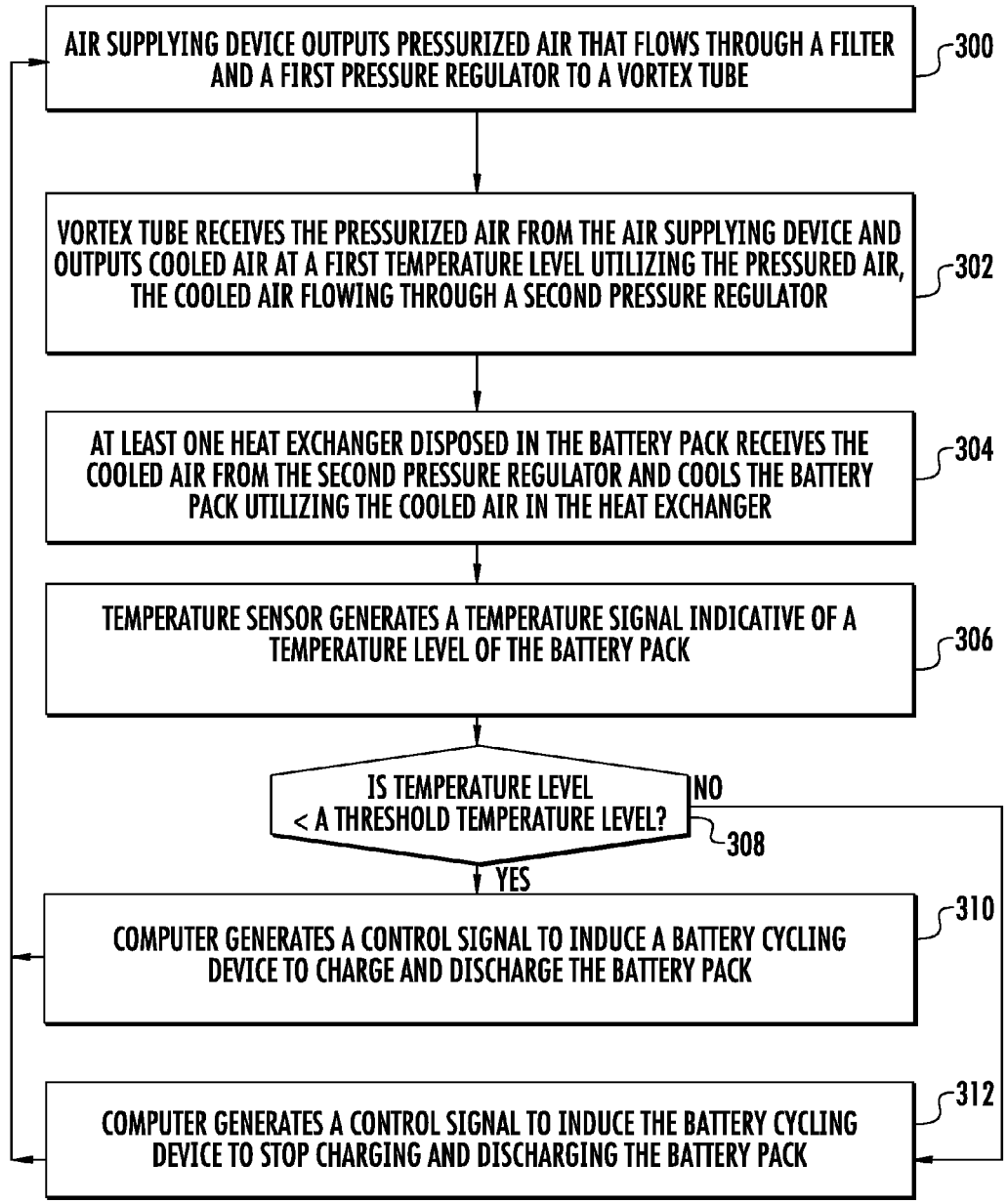
FIG. 8 is a flowchart of a method of cooling and cycling a battery pack in accordance with another exemplary embodiment.

Referring to FIGS. 1 and 8, a flowchart of a method for cooling and cycling the battery pack 22 in accordance with another exemplary embodiment will be explained.

At step 300, the air supplying device 40 outputs pressurized air that flows through the filter 42 and the pressure regulator 50 to the vortex tube 60. After step 300, the method advances to step 302.

At step 302, the vortex tube 60 receives the pressurized air from the air supplying device 40 and outputs cooled air at a first temperature level utilizing the pressurized air. The cooled air flows through the pressure regulator 50. After step 302, the method advances to step 304.

At step 304, at least one heat exchanger 26 disposed in the battery pack 22 receives the cooled air from the pressure regulator 70 and cools the battery pack 22 utilizing the cooled air. After step 304, the method advances to step 306.

At step 306, the temperature sensor 100 generates a temperature signal indicative of a temperature level of the battery pack 22. After step 306, the method advances to step 308.

At step 308, the computer 112 makes a determination as to whether the first temperature level is less than a threshold temperature level. If the value of step 308 equals "yes", the method advances to step 310. Otherwise, the method advances to step 312.

At step 310, the computer 112 generates a control signal to induce a battery cycling device 110 to charge and discharge the battery pack 22. After step 310, the method returns to step 300.

Referring again to step 310, if the value of step 310 equals "no", the method advances to step 312. At step 312, the computer 112 generates a control signal to induce a battery cycling device 110 to stop charging and discharging the battery pack 22. After step 312, the method returns to step 300.

The system 10 and the method for cooling and cycling a battery pack provide a substantial advantage over other systems and methods. In particular, the system 10 and the method utilize cooled air from a vortex tube to cool the battery pack during charging and discharging of the battery pack.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A system for cycling a battery pack, comprising:
an air supplying device configured to output pressurized air; and
a vortex tube configured to receive the pressurized air from the air supplying device and to output cooled air at a first temperature level utilizing the pressurized air;
at least one heat exchanger disposed in the battery pack that is configured to receive the cooled air from the vortex tube and to cool the battery pack; and
a battery cycling device electrically being coupled to the battery pack, the battery cycling device configured to charge and discharge the battery pack when the battery pack is being cooled.

2. The system of claim 1, further comprising:
a temperature sensor disposed proximate to the battery pack that generates a temperature signal indicative of a temperature level of the battery pack; and
a computer operably coupled to a temperature sensor and to the battery cycling device, the computer configured to receive the temperature signal and to determine the temperature level of the battery pack based on the temperature signal; and if the temperature level is less than a threshold temperature level, the computer further configured to generate a control signal to induce the battery cycling device to charge and discharge the battery pack.

3. The system of claim 1, wherein the threshold temperature level is 25 degrees Celsius.

4. The system of claim 1, further comprising a pressure regulator fluidly coupled between the vortex tube and the battery pack, the pressure regulator configured to maintain a pressure level of the cooled air below a threshold pressure level.

5. The system of claim 4, wherein the threshold pressure level is 15 pounds-per-square inch.

6. A method for cycling a battery pack, comprising:
outputting pressurized air from an air supplying device;
receiving the pressurized air from the air supplying device at a vortex tube and outputting cooled air from the vortex tube at a first temperature level in response to the pressurized air;
receiving the cooled air from the vortex tube in at least one heat exchanger disposed in the battery pack and cooling the battery pack utilizing the heat exchanger; and
charging and discharging the battery pack utilizing a battery cycling device when the battery pack is being cooled.

7. The method of claim 6, further comprising:
generating a temperature signal indicative of a temperature level of the battery pack utilizing a temperature sensor disposed proximate to the battery pack; and
determining the temperature level of the battery pack based on the temperature signal utilizing a computer; and
if the temperature level is less than a threshold temperature level, then generating a control signal to induce the battery cycling device to charge and discharge the battery pack utilizing the computer.

8. The method of claim 6, wherein the threshold temperature level is 25 degrees Celsius.

9. The method of claim 6, further comprising maintaining a pressure level of the cooled air below a threshold pressure level utilizing a pressure regulator fluidly coupled between the vortex tube and the battery pack.

10. The method of claim 9, wherein the threshold pressure level is 15 pounds-per-square inch.

\* \* \* \* \*